Nov. 21, 1944. A. MELDAHL 2,363,430
THRUST AND JOURNAL BEARING
Filed March 8, 1943

Inventor:
Axel Meldahl,
By Pierce & Scheffler,
Attorneys

Patented Nov. 21, 1944

2,363,430

UNITED STATES PATENT OFFICE 2,363,430

THRUST AND JOURNAL BEARING

Axel Meldahl, Ennetbaden, Switzerland, assignor to Aktiengesellschaft Brown, Boveri & Cie., Baden, Switzerland, a joint-stock company Application March 8, 1943, Serial No. 478,411
In Switzerland February 12, 1942

2 Claims. (Cl. 308—160)

This invention relates to thrust and journal bearings, and particularly to bearings in which there are a number of tilting pads that move independently to equalize the distribution of the load over the bearing surfaces.

An object of the invention is to provide a tilting pad having a base section and a thin shoe or bearing section that expands independently of the base section when heated during use.

An object is to provide a tilting pad comprising a base section and a thin bearing shoe that rests upon the base section and is secured to it along one edge in such manner that the bearing shoe may expand freely when heated locally by friction. A further object is to provide a tilting pad comprising a base section and relatively thin shoe or lining that is pressed flat against the base section by the pressure of the lubricating oil.

These and other objects and the advantages of the invention will be apparent from the following specification when taken with the accompanying drawing in which.

Figure 1:
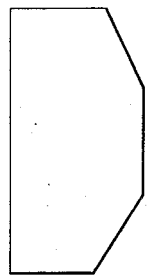
Figs. 1 to 4 are somewhat schematic views of a tilting pad, Figs. 1, 2 and 3 being end elevations and Fig. 4 being a plan view.
Figure 2:
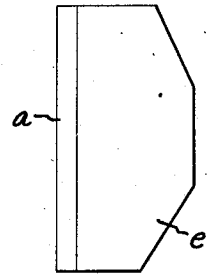
Figure 3:
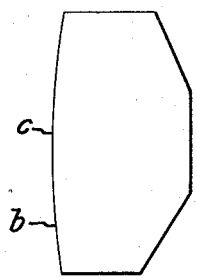
Figure 4:
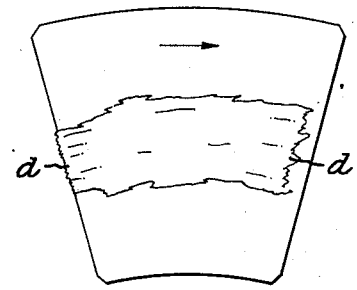

It has been observed that when a tilting pad in a thrust or journal bearing seizes, this seizing always starts at a place which lies over the supporting point of the pad. An explanation for this phenomenon is that the element bends, even if only slightly, under the pressure to which it is subjected so that the oil film becomes thinner locally, is more heavily stressed and finally breaks. For this reason the elements are made very strong as shown in Fig. 1 of the drawing, that is to say of great thickness, and when provided with a metal lining $a$ (Fig. 2), for instance of white metal, this latter is rigidly fixed to the pad so that also this part of the bearing can be utilized to carry the load. The foregoing theory was supported by the observation that the surface where the seizing occurs is deeper at the centre than at the edge of the pad. This was explained by the fact that the pad which is originally flat, bends under the influence of the load and its surface becomes spherical (Fig. 3), a flat being ground on this spherical surface at $c$ by the collar during the seizing process, so that when the pad assumes its original shape again the portion $d$—$d$ affected by the seizing naturally appears as a hollow surface (Fig. 4).

Exhaustive tests have now shown, however, that contrary to the usual assumption made hitherto the bending of the pad is not caused by the load but by the one-sided heating of the pad and the present invention is based on a recognition of this fact. According to the invention a comparatively thin shoe or loose lining is located on the pad of known shape in such a manner that it can expand freely by sliding on the body portion of the pad, thereby to reduce the tendency toward a local heating of portions of the thin shoe or lining.

Figure 5:
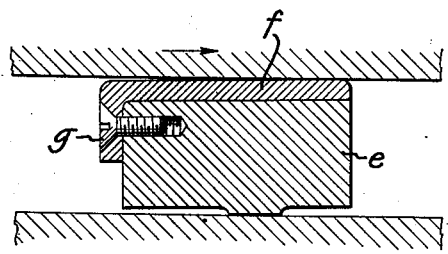
Fig. 5 is a fragmentary sectional view of a thrust bearing embodying the invention.
Figure 6:
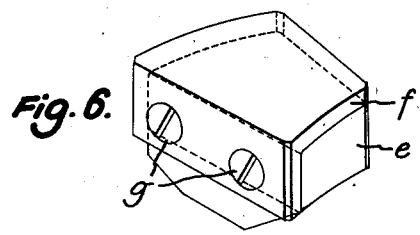
Fig. 6 is a perspective view of the tilting pad.

A constructional example of the invention is illustrated in Figs. 5 and 6 of the drawing where the bearing pad $e$ of a bearing together with the loose lining $f$ which has a single edge flange fastened to one side of the pad by the screws $g$ is shown in cross-section and perspective view respectively. With this construction the loose lining $f$ is in full surface engagement with the flat surface of the pad $e$ and can expand freely by sliding movement with respect to the pad; the pad $e$ on the other hand remains level and by this means the surface of the pad also remains flat. The result of this is that pads of this kind are able to carry a much higher load.

The loose lining $f$ and the pad $e$ can be made of different metals, for instance the lining $f$ of bronze and the pad $e$ of steel.

The lining should be made so thin that the force of the oil pressure acting on it presses it flat on the pad. Tests made with a bronze lining 3 millimetres thick on a pad with a bearing surface 40 x 40 millimetres enabled the loading capacity to be increased by more than 75%.

I claim:

1. A tilting pad for thrust and journal bearings comprising a base section having a flat surface, a lining having a surface in sliding engagement with the flat surface of the base section, and means securing said lining to said base section; said means comprising an edge flange on said lining, and means securing the edge flange to a side of said base section.

2. A tilting pad as recited in claim 1, wherein said lining is relatively thin and is pressed into surface engagement with the flat surface of the base section by pressure of the lubricating oil

AXEL MELDAHL.